W. W. WHITE.
DRAFT ATTACHMENT.
APPLICATION FILED MAR. 22, 1912.
1,038,697.
Patented Sept. 17, 1912.
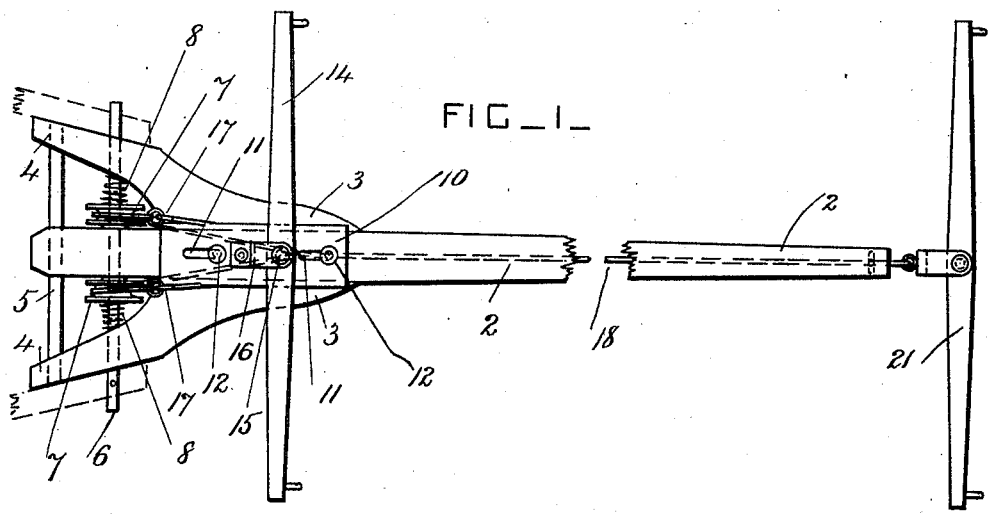
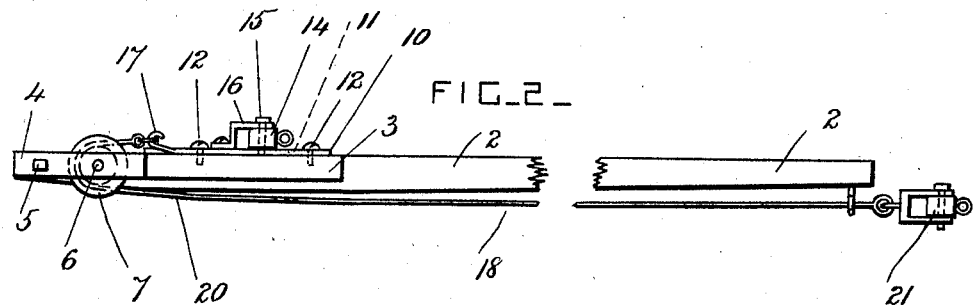
Witnesses
A. E. Davis.
W. Allen
Inventor
Walter W. White,
By Hubert W. J. Jennes
Attorney

UNITED STATES PATENT OFFICE.

WALTER W. WHITE, OF DAWSON, NORTH DAKOTA.

DRAFT ATTACHMENT.

1,038,697. Specification of Letters Patent. Patented Sept. 17, 1912.

Application filed March 22, 1912. Serial No. 685,593.

*To all whom it may concern:*

Be it known that I, WALTER W. WHITE, a citizen of the United States, residing at Dawson, in the county of Kidder and State of North Dakota, have invented certain new and useful Improvements in Draft Attachments; and I do hereby declare the following to be a full, clear, and exact description of the invention, such as will enable others skilled in the art to which it appertains to make and use the same.

This invention relates to draft attachments for wagons and other vehicles and agricultural implements; and it consists in the novel construction and combination of the parts hereinafter fully described and claimed whereby an additional horse or horses can be hitched to the draft pole in a manner which equalizes the pulling power of the animals.

In the drawings, Figure 1 is a plan view of a draft pole provided with a draft attachment according to this invention. Fig. 2 is a side view of the same.

The draft tongue 2 is provided at its rear end with lateral extension pieces 3 so as to form forked portions 4, and a cross-piece 5 is provided to assist in holding these extension pieces in position. A shaft 6 is arranged in the forked portions, and 7 are grooved sheaves or rollers journaled on the shaft 6 on opposite sides of the draft tongue. Springs 8 are provided on the shaft 6, to press the sheaves toward the draft tongue and prevent them from slipping on the shaft. A plate 10 is arranged longitudinally of the draft tongue, and is provided with longitudinal slots 11. These slots slide over pins or bolts 12 which project from the draft tongue and which connect the plate to it. A whiffletree 14 is pivoted by a pin 15 to the middle part of the plate 10 and to a bracket 16 which projects from the plate, so that the whiffletree is not directly connected to the draft tongue.

The rear end of the plate 10 is provided with two hooks 17, or other suitable connections, arranged substantially in line with the guide sheaves 7. A flexible draft connection 18 is provided and extends longitudinally of the draft tongue, and is formed of any suitable material, chain being preferred. The rear end of this draft connection is formed of two stretches 20 which are carried over the guide sheaves 7 and hooked onto the slidable plate 10.

Two additional horses can be hitched to the front end of the flexible draft connection 18 by a whiffletree 21 similar to the whiffletree 14, and the slidable plate then permits the pull of all the horses to be equalized. When additional horses are not required the flexible stretches 20 are unhooked from the slidable plate, and the draft connection 18 is removed. The springs hold the sheaves 7 in position so that the additional horses can be quickly hitched up whenever necessary.

What I claim is:

1. The combination, with a draft pole, of two laterally movable sheaves journaled at the rear end portion of the draft pole and arranged one on each side thereof, a whiffletree arranged in front of the said sheaves and slidable longitudinally of the draft pole, a guide for the said whiffletree, springs which press the said sheaves toward the draft pole, and a flexible draft connection extending longitudinally of the draft pole and provided at its rear end with two stretches which pass over the said sheaves and are operatively connected with the said whiffletree.

2. The combination, with a draft pole having two forked portions at its rear part, and a shaft passing through the said forked portions, of two sheaves journaled on the said shaft, springs encircling the said shaft and pressing the sheaves toward the central pole, a longitudinally slidable plate operatively connected to the draft pole in front of the sheaves, a whiffletree pivoted to the said plate, and a flexible draft connection extending longitudinally of the draft pole and provided at its rear end with two stretches which pass over the said sheaves and are connected to the said plate.

In testimony whereof I have affixed my signature in the presence of two witnesses.

WALTER W. WHITE.

Witnesses:
G. H. LINDELL,
JOHN S. WERNER.